(12) United States Patent
Cho et al.

(10) Patent No.: US 8,197,081 B2
(45) Date of Patent: Jun. 12, 2012

(54) BACKLIGHT ASSEMBLY, DISPLAY DEVICE HAVING THE SAME, AND METHOD OF MANUFACTURING THE DISPLAY DEVICE

(75) Inventors: Joo-Woan Cho, Asan-si (KR); Yong-Woo Lee, Suwon-si (KR); Seong-Sik Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 360 days.

(21) Appl. No.: 12/607,361

(22) Filed: Oct. 28, 2009

(65) Prior Publication Data
US 2010/0118514 A1    May 13, 2010

(30) Foreign Application Priority Data
Nov. 13, 2008    (KR) .................. 10-2008-0112828

(51) Int. Cl.
*G09F 13/04*    (2006.01)
(52) U.S. Cl. ....... 362/97.1; 362/97.3; 362/613; 362/630
(58) Field of Classification Search ........ 362/97.1–97.3, 362/612, 613, 630–634
See application file for complete search history.

(56) References Cited

U.S. PATENT DOCUMENTS

| | | | | |
|---|---|---|---|---|
| 7,922,380 B2 * | 4/2011 | Park | ............................... | 362/631 |
| 7,959,324 B2 * | 6/2011 | Hsu | ............................... | 362/247 |
| 7,990,512 B2 * | 8/2011 | Yang | ............................... | 349/150 |
| 8,031,292 B2 * | 10/2011 | Chun et al. | ....................... | 349/65 |
| 8,031,294 B2 * | 10/2011 | Kim | ................................ | 349/65 |
| 8,033,708 B2 * | 10/2011 | Tsubaki | .......................... | 362/612 |
| 8,047,697 B2 * | 11/2011 | Shigeta et al. | ................. | 362/612 |

FOREIGN PATENT DOCUMENTS

| | | |
|---|---|---|
| JP | 11-160681 A | 6/1999 |
| KR | 1020020002887 A | 1/2002 |
| KR | 1020070000876 A | 1/2007 |

* cited by examiner

*Primary Examiner* — Anabel Ton
(74) *Attorney, Agent, or Firm* — Cantor Colburn LLP

(57) ABSTRACT

A backlight assembly includes a light guide plate, a light source assembly disposed adjacent to at least one side of the light guide plate and supplies light to the light guide plate, a container receiving the light guide plate and the light source assembly and including a bottom portion and a first sidewall extended from edges of the bottom portion to form a receiving space, and a coupling member disposed inside the receiving space of the container, and overlapping an upper surface of the light source assembly. The light source assembly is disposed adjacent to the first sidewall, the bottom portion, the coupling member and the light guide plate. The insertion direction of the coupling member is substantially perpendicular to the bottom portion of the container.

20 Claims, 14 Drawing Sheets

BACKLIGHT ASSEMBLY, DISPLAY DEVICE HAVING THE SAME, AND METHOD OF MANUFACTURING THE DISPLAY DEVICE

This application claims priority to Korean Patent Application No. 10-2008-0112828 filed on Nov. 13, 2008, and all the benefits accruing therefrom under 35 U.S.C. §119, the disclosure of which is incorporated herein by reference in its entirety.

BACKGROUND OF THE INVENTION

1. Field of the Invention

The present invention relates to a backlight assembly, a display device having the same, and a method of manufacturing the display device, and more particularly, to a backlight assembly that can be simply assembled and disassembled and can minimize an overall thickness of the backlight assembly, a display device including the backlight assembly, and a method of manufacturing the display device.

2. Description of the Related Art

Liquid crystal displays ("LCDs") are one of the most widely used flat panel displays ("FPDs"). An LCD includes two substrates and a liquid crystal layer interposed between the two substrates. The LCD rearranges liquid molecules of the liquid crystal layer by applying a voltage to the electrodes, and thus controls the amount of light that passes through the liquid crystal layer. In this way, the LCD displays desired images.

Being non-self-luminous, LCDs require a backlight assembly, which includes light sources, i.e., light-emitting diodes, to display images. A backlight assembly provides light to a display panel from behind the display panel. Backlight assemblies are classified into direct-type backlight assemblies and edge-type backlight assemblies according to the position of light sources which emit light. In direct-type backlight assemblies, light sources are disposed directly under a display panel, such that the light sources substantially overlap the display panel in a plan view of the display panel. In edge-type backlight assemblies, light sources are disposed adjacent to (e.g., not overlapping the display panel) or under one or more sides of a display panel, and light emitted from the light sources is delivered to the display panel via a light guide plate.

Edge-type backlight assemblies require lamp covers which reflect light towards the light guide plate and/or the display panel, while substantially surrounding light sources arranged adjacent to an incident side of the light guide plate.

BRIEF SUMMARY OF THE INVENTION

Since edge type backlight assemblies require lamp covers which are configured to reflect light towards the light guide plate and/or the display panel, while substantially surrounding light sources arranged adjacent to an incident side of the light guide plate, there may be technical difficulties in manufacturing such as backlight assembly. For example, if a lamp cover includes separate parts assembled together, the backlight assembly requires the light guide plate, the light source (e.g., a lamp) and a containing structure for containing the lamp cover, which undesirably increases the number of parts required for the backlight assembly. If the lamp cover is formed integrally with a container, the integral lamp cover and container should be formed after being divided for the coupling of the light guide plate and the lamp, which undesirably increases time and costs of manufacturing. As such, there is a need for a backlight assembly structure that makes the assembling and disassembling of the backlight assembly relatively easy, and can minimize the number of parts.

An exemplary embodiment of the present invention provides a backlight assembly which has a structure that makes the assembling and disassembling of the backlight assembly relatively easy, and minimizes an overall dimension (e.g., thickness) of the backlight assembly.

An exemplary embodiment of the present invention also provides a display device including a backlight assembly which has a structure that makes the assembling and disassembling of the backlight assembly relatively easy, and minimizes an overall dimension (e.g., the thickness) of the display device.

An exemplary embodiment of the present invention also provides a method of manufacturing a display device including a backlight assembly which has a structure that makes the assembling and disassembling of the backlight assembly relatively easy, and minimizes an overall dimension (e.g., the thickness) of the display device.

In an exemplary embodiment of the present invention, there is provided a backlight assembly including a light guide plate, a light source assembly which is arranged adjacent to at least one side of the light guide plate and supplies light to the light guide plate, a container which receives the light guide plate and the light source assembly and includes a bottom portion and a first sidewall extending from edges of the bottom portion and defining a receiving space of the container, and a coupling member disposed in the receiving space and adjacent to an inside of the first sidewall and overlapping an upper surface of the light source assembly. The light source assembly is disposed adjacent to the first sidewall, the bottom portion, the coupling member and the light guide plate. The insertion direction of the coupling member is substantially perpendicular to the bottom portion of the container.

In an exemplary embodiment of the present invention, there is provided a display device including a display panel which displays images, a light source assembly which generates and supplies light to the display panel, a light guide plate which guides the light to the display panel, a container which includes a bottom portion, and a first sidewall portion and a second sidewall portion extending from edges of the bottom portion to define a receiving area of the container, where the light guide plate and the light source assembly are disposed in the receiving area, and a coupling member which is disposed in the receiving area of the container, disposed adjacent to an inside of the first sidewall portion, and overlapping an upper surface of the light source assembly. The light source assembly is disposed adjacent to the first sidewall portion, the bottom portion, the coupling member and the light guide plate. The insertion direction of the coupling member is substantially perpendicular to the bottom portion of the container.

In an exemplary embodiment of the present invention, there is provided a method of manufacturing a display device. The method includes disposing a light guide plate and a light source assembly in a container which includes a bottom portion, and a first sidewall portion and a second sidewall portion each of which extends from the bottom portion, and connecting the container with a coupling member which is disposed between the first and second sidewall portions of the container and overlapping an upper surface of the light source assembly. The light source assembly is disposed directly adjacent to the first sidewall portion, the bottom portion, the coupling member and the light guide plate. The coupling member is coupled to the container in a direction that is perpendicular to the bottom portion, such that the coupling member is disposed between the first and second sidewall portions of the container.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
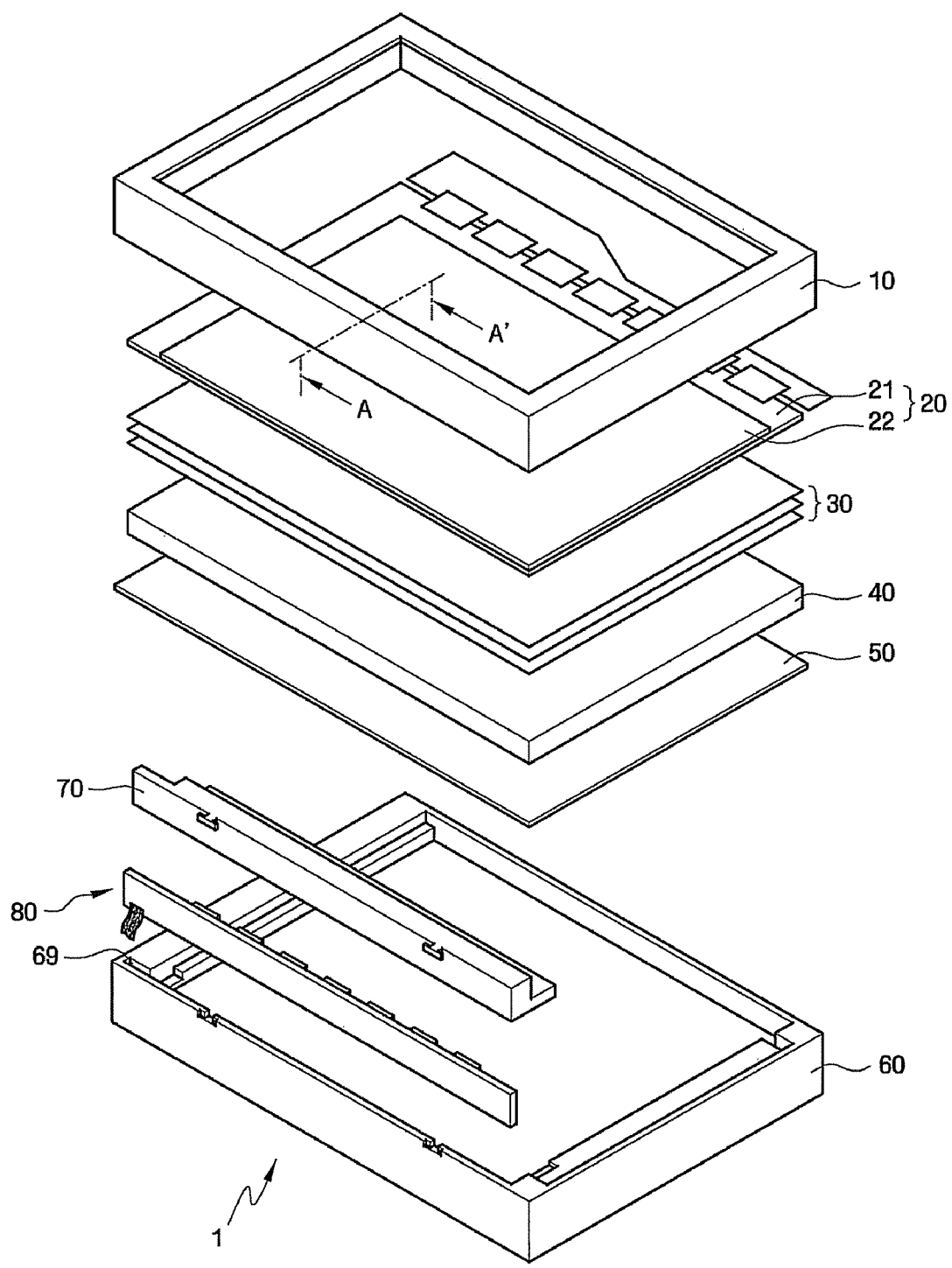
FIG. 1 is an exploded perspective view of an exemplary embodiment of a display device according to the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Figure 2:
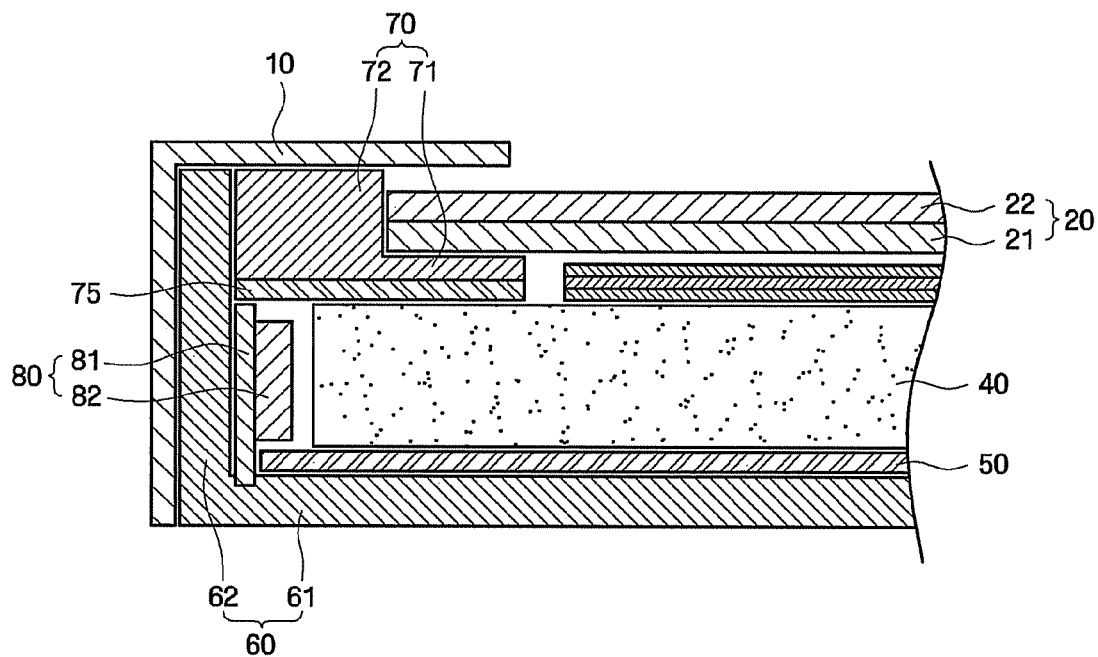
FIG. 2 is a cross-sectional view of the display device of FIG. 1 along line A-A'.

An exemplary embodiment of a display device 1 according to the present invention will be described in detail with reference to FIGS. 1 and 2. FIG. 1 is an exploded perspective view of the exemplary embodiment of the display device according to the present invention. FIG. 2 is a cross-sectional view of the display device of FIG. 1 along line A-A'.

The display device according to the present invention includes a display panel and a backlight assembly.

A display panel 20 displays images, and includes a lower display panel 21, an upper display panel 22 and a liquid crystal layer (not shown) interposed between the lower and upper display panels 21 and 22.

The lower display panel 21 includes gate lines (not shown), data lines (not shown), a thin-film transistor ("TFT") array and a pixel electrode. The upper display panel 22 includes a color filter, a black matrix and a common electrode. In the illustrated exemplary embodiment, the color filter and the common electrode may be formed on the lower display panel 21.

The backlight assembly includes an optical sheet 30, a reflective sheet 50, a light source assembly 80, a receiving container and a coupling member 70. The receiving container includes an upper cover 10 and a lower cover (e.g., container) 60. The upper cover 10 includes a receiving space where the display panel 20 is contained. The receiving space of the upper cover 10 may be defined by an upper surface at the frontmost area of the upper cover 10, and sidewalls extending from the upper surface of the upper cover 10 toward a rear of the display device 1 and the lower container 60. An opening window, which exposes the display panel 20, is formed substantially in the center of the upper cover 10.

The upper cover 10 is coupled with the lower container 60. The optical sheet 30, a light guide plate 40, the reflective sheet 50 and the light source assembly 80 are received between the upper cover 10 and the lower container 60. The display device 1 includes the coupling member 70, which is coupled with the lower container 60 and inserted into the lower container 60 from the upper side (e.g., front side) of the light source assembly 80.

The light source assembly 80 generates light and provides the generated light to the display panel 20. Referring to FIG. 2, the light source assembly 80 includes a light source 82 which discharges light, and a circuit board or substrate 81 on which the light source 82 is mounted. The light source assembly 80 may include a plurality of the light source 82 and/or a plurality of the circuit board 81. The circuit board 81 of a single light source assembly 80 may be a continuous and indivisible member, as illustrated in the exemplary embodiment of FIG. 1.

The light source 82 may include one or more light-emitting diodes ("LEDs") which generate and emit light. A light source, such as LEDs, may be continually and consecutively arranged in the circuit board 81 along the circuit board 81. In the illustrated embodiment, a plurality of discrete point light sources 82 are disposed at substantially regular intervals along a longitudinal direction of the circuit board 81.

Point-source-type lamps such as light-emitting diodes, and line-source-type lamps such as fluorescent lamps, may be used as the light source 82. In exemplary embodiments, lamps that may be used as the light source include, but are not limited to, a cold cathode fluorescent lamp ("CCFL"), a hot cathode fluorescent lamp ("HCFL") and an external electrode fluorescent lamp ("EEFL").

In the exemplary embodiment of FIG. 1 illustrated an edge-type backlight assembly, one or more of the light source assembly 80 may be installed at a light incident side of the light guide plate 40. The light source assembly 80 may include a first portion disposed at a first light incident side of the light guide plate 40, and a second portion disposed at a second light incident side of the light guide plate 40 facing the first light incident side, such that the light source assembly 80 is disposed at both of opposing sides of the light guide plate 40. Alternatively, the light source assembly 80 may be arranged at three sides or four sides of the light guide plate 40. The arrangement of such a light source assembly 80 can be modified in various ways, considering the luminance and uniformity of a light-emitting side (e.g., at a front) of the light guide plate 40.

The light guide plate 40 guides light supplied from the light source assembly 80 to the display panel 20. The light guide plate 40 is formed as a panel (e.g., substantially planar member), and guides light generated from the light source 82 to the display panel 20 positioned at the upper side of the light guide plate 40. The light guide plate 40 may be made of a transparent plastic material such as PMMA (polymethymethacrylate). In an exemplary embodiment, various patterns for converting the direction of the incident light into the light guide plate 40 to the display panel 20 may be formed, such as by printing.

The optical sheet 30 is installed at the upper side of the light guide plate 40, and diffuses and collects light transmitted from the light guide plate 40. The optical sheet 30 may include at least one of a diffusion sheet, a prism sheet and a protection sheet. The optical sheet 30 may be formed as an optical sheet 30 having complex functions, that can perform all the functions of the diffusion sheet, the prism sheet and the protection sheet. In one exemplary embodiment, the complex function optical sheet 30 may be configured to have a diffusion function at a lower side, to include a prism pattern (not shown) at the upper side, and to include a protective layer (not shown) on the prism pattern. Since the complex function optical sheet 30 includes both the diffusion function and the prism function, the number of elements is advantageously reduced and an overall dimension (e.g., thickness) is reduced defining a slimmer display device.

The reflective sheet 50 is installed adjacent to the lower side of the light guide plate 40, and reflects light discharged towards the lower side of the light guide plate 40, back towards the display panel 20. In an exemplary embodiment where the reflective sheet 50 positioned at the lower side of the light guide plate 40, the reflective sheet 50 reduces the loss of incident light to the display panel 20 and improves uniformity of light transmitted to the light-emitting side of the light guide plate 40, such as by reflecting non-reflected light back to the light-emitting side of the light guide plate 40 due to fine dot patterns formed at the lower side of the light guide plate 40.

The lower container 60 receives the optical sheet 30, the light guide plate 40, the reflective sheet 50 and the light source assembly 80, and is coupled with the coupling member 70. The display panel 20 is disposed on the upper side of both the lower container 60 and the coupling member 70.

Figure 3:
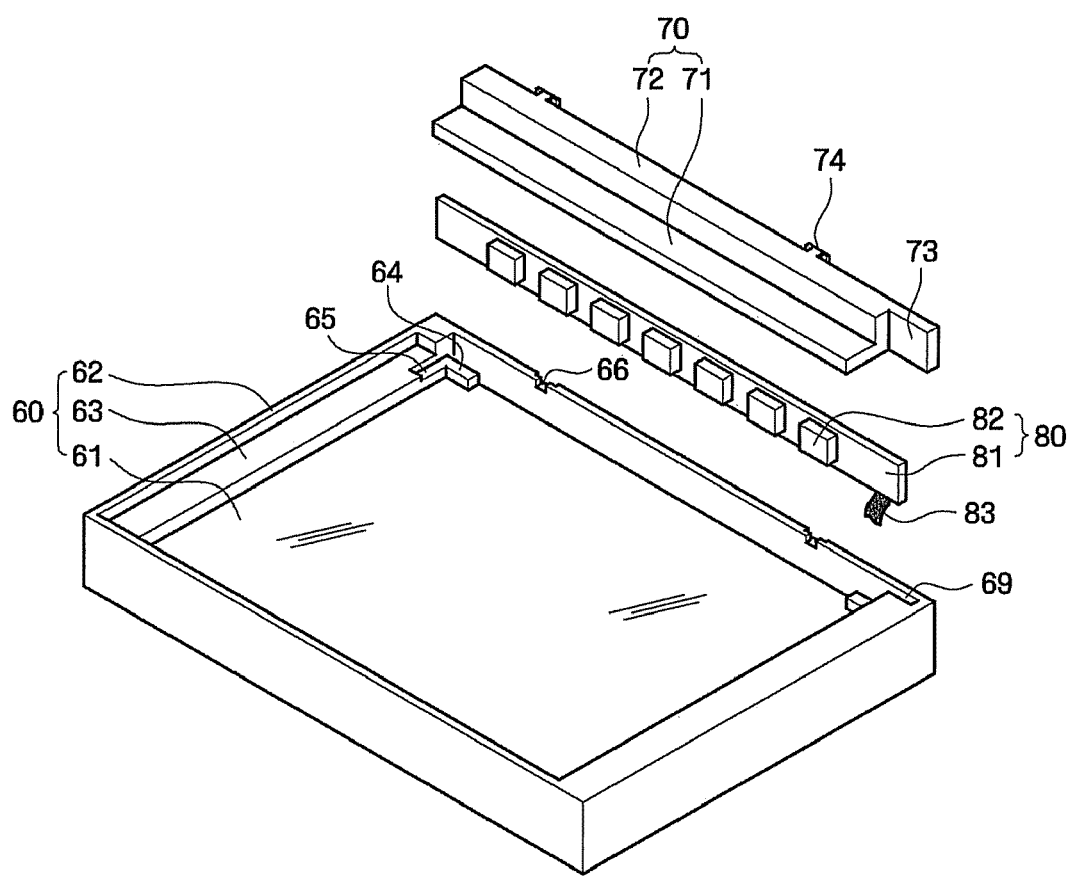
FIG. 3 is an exploded perspective view of a container, a light source assembly and a coupling member included in the display device of FIG. 1.
Figure 4:
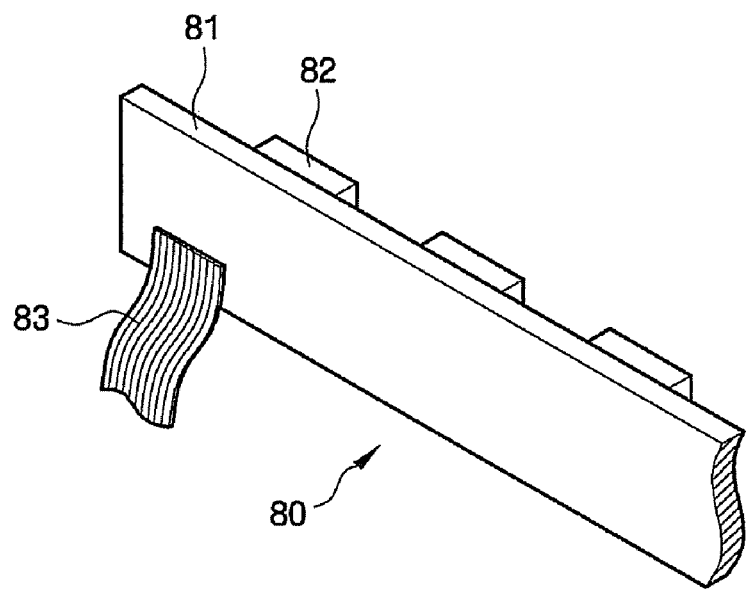
FIG. 4 is a partial perspective view of the rear side of the light source assembly of the display device of FIG. 1.
Figure 5:
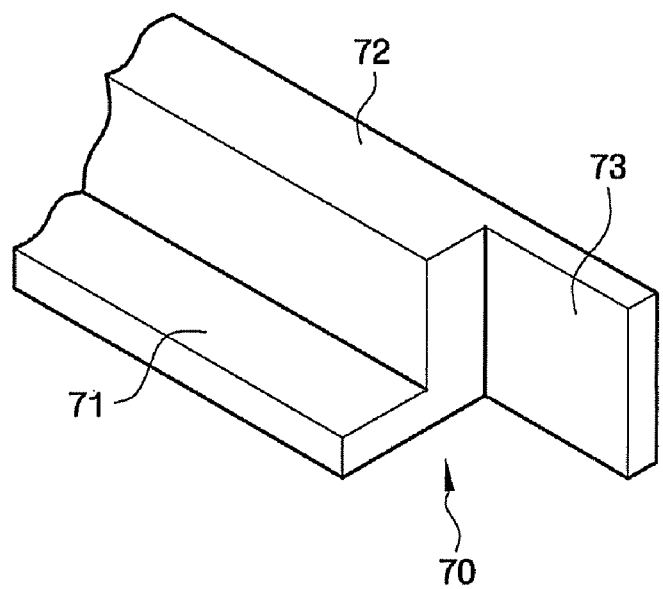
FIG. 5 is a partial perspective view of the coupling member of the display device of FIG. 1.
Figure 6:
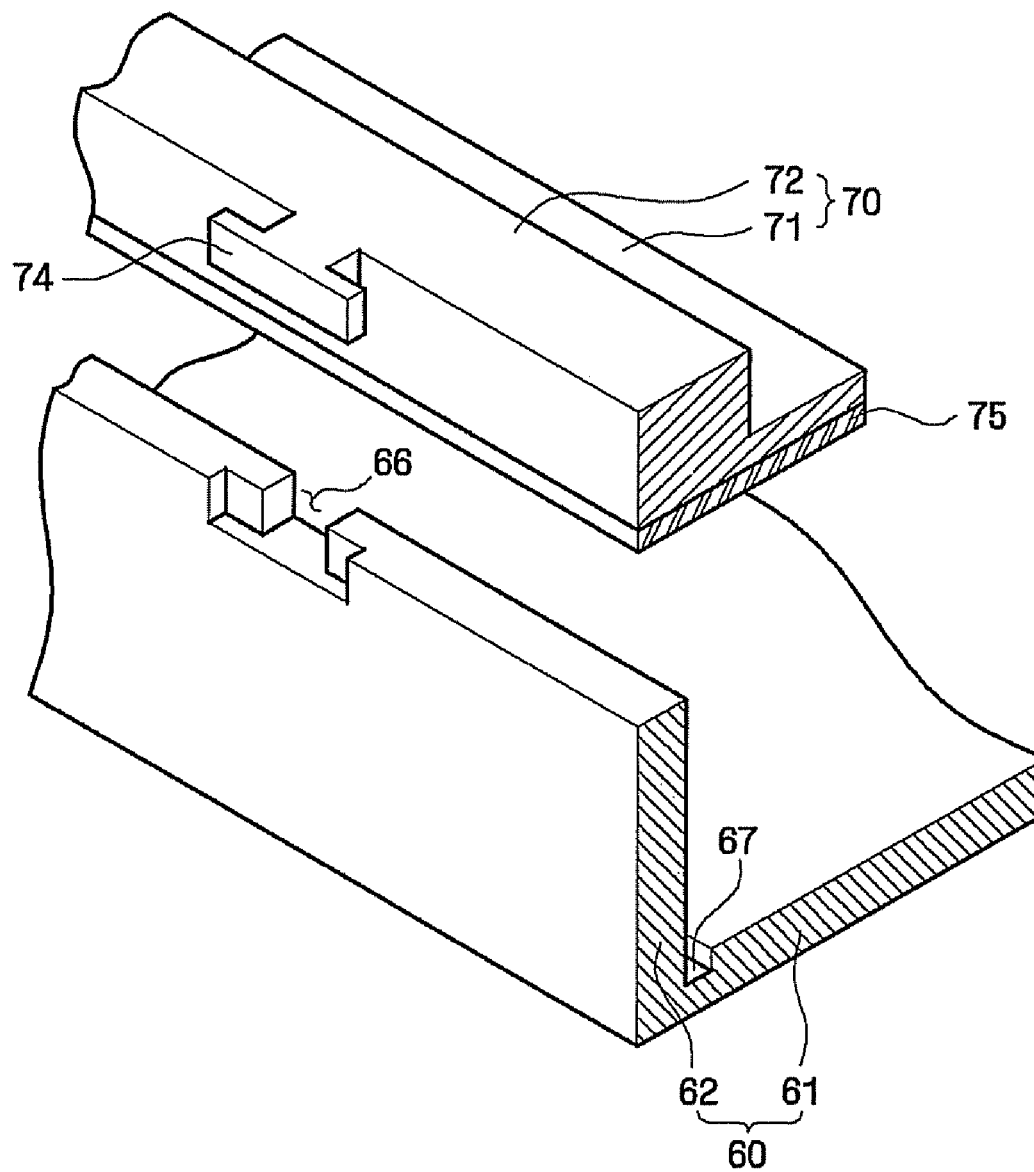
FIG. 6 is a partial perspective view of an exemplary embodiment of a coupling portion of a container and a coupling member.
Figure 7:
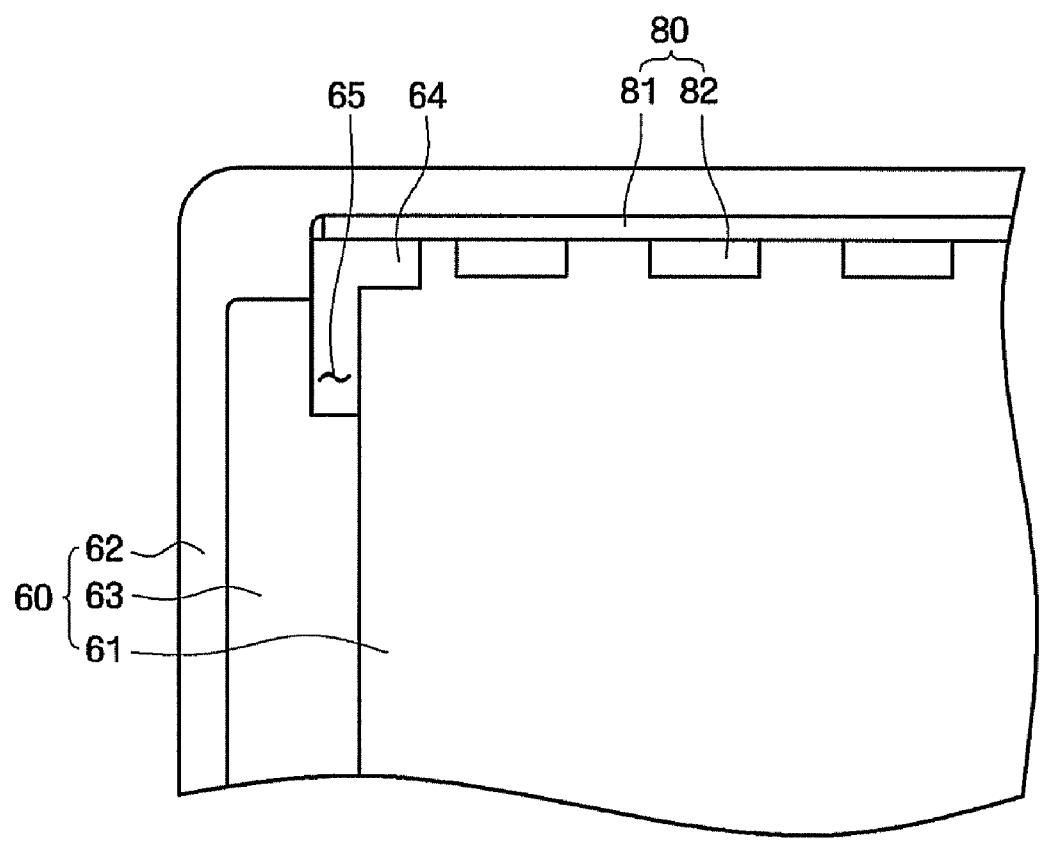
FIG. 7 is a plane view illustrating an exemplary embodiment of a container where a light source assembly has been coupled therewith.
Figure 8:
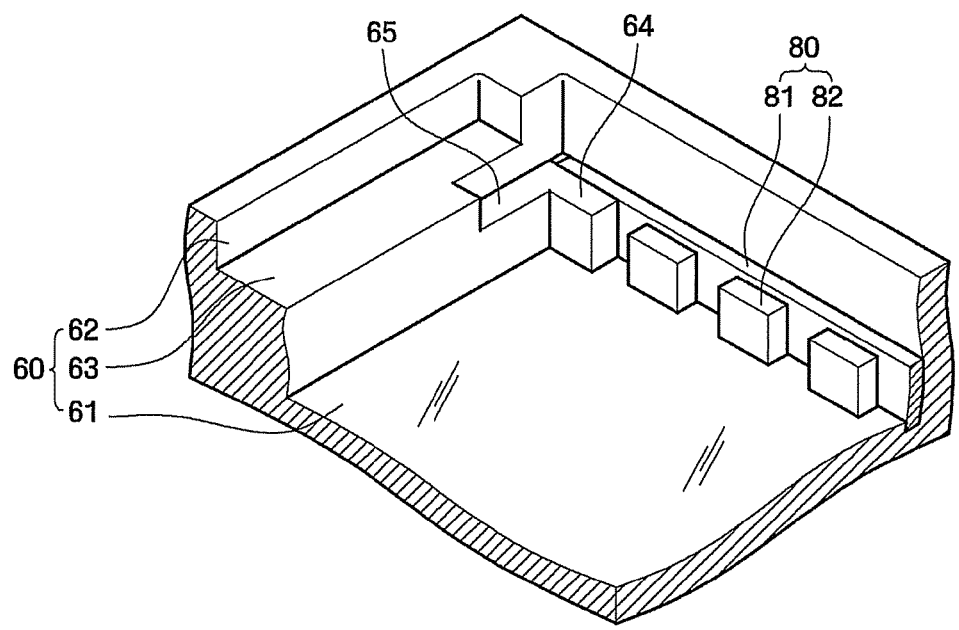
FIG. 8 is a partial perspective view of another exemplary embodiment of a container where a light source assembly has been coupled therewith.
Figure 9:
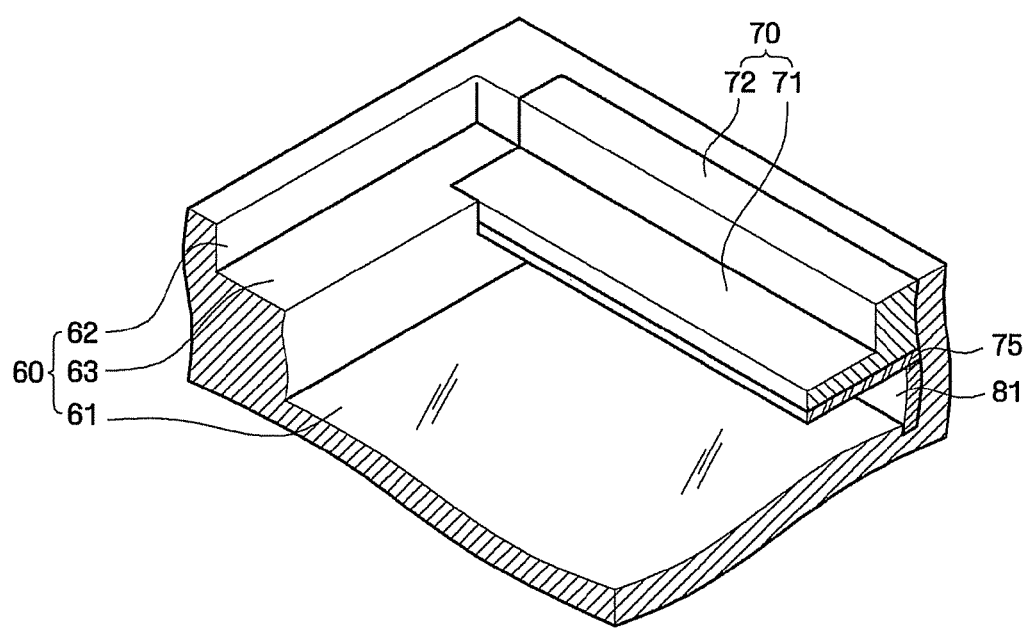
FIG. 9 is a partial perspective view of another exemplary embodiment of a container where a light source assembly has been coupled therewith.

Referring to FIGS. 3 to 9, the lower container 60, the light source assembly 80 and the coupling member 70 will be described in more detail. FIG. 3 is an exploded perspective view of the lower container 60, the light source assembly 80 and the coupling member 70 included in the display device 1 of FIG. 1. FIG. 4 is a partial perspective view of the rear side of the light source assembly 80 of the display device 1 of FIG. 1. FIG. 5 is a partial perspective view of the coupling member 70 of the display device 1 of FIG. 1. FIG. 6 is a partial perspective view of an exemplary embodiment of a coupling portion of a lower container and a coupling member. FIG. 7 is a plane view illustrating an exemplary embodiment of a lower container where a light source assembly has been coupled therewith. FIG. 8 is a partial perspective view of a lower container where a light source assembly has been coupled with. FIG. 9 is a partial perspective view of another exemplary embodiment of a lower container where a light source assembly has been coupled therewith.

Referring to FIGS. 3 to 5, a lower container 60 includes a first sidewall 62, a first flange 63, a bottom portion 61, a first guide groove 69 and a second guide groove 65. The lower container 60 includes the first sidewall 62 formed in a substantially rectangle-shaped frame. The first sidewall 62 may include a plurality of sidewall portions, where a pair of individual sidewall portions face each other. A lower side of each of the sidewall portions of the first sidewall 62 is connected to each other by the bottom portion 61. In the illustrated embodiment of FIG. 3, the lower container 60 includes the bottom portion 61 and four first sidewalls 62 extended from the bottom portion 61. The bottom portion 61 of the lower container 60 may be a single and continuous member, or may include cutout areas where a portion of the bottom portion 61 is not disposed.

In an exemplary embodiment, the lower container 60 may be formed by a method such as an injection molding process, and the first sidewall 62 and the bottom portion 61 may be integrally formed. As used herein, "integrally" indicates being a single, continuous and indivisible member.

The lower container 60 receives an optical sheet 30, a light guide plate 40, a light source assembly 80 and a reflective sheet 50, and forms a basic structure of the display, thereby providing a strength and rigidity to the display device. In the lower container 60, the first flange 63 is extended from an inside of the first sidewall 62, towards an inner area of the lower container 60.

A display panel (see reference numeral 20 of FIG. 1) is received on the first flange 63. The first flange 63 may be disposed corresponding to at least one of the first sidewalls 62 except for the first sidewall 62 which is adjacent to the light source assembly 80 among four first sidewalls 62, such as illustrated in FIG. 3. In alternative embodiments, the first flange 63 may be formed at three first sidewalls 62 except the first sidewall 62 adjacent to the light source assembly 80 among the four first sidewalls 62, or the first flange 63 may be formed at two first sidewalls 62 except the first sidewall 62 facing the light source assembly 80 and the first sidewall 62 adjacent to the light source assembly 80.

The first flange 63 may be disposed in such a manner that an upper surface of the first flange 63 contacts a portion (e.g., a lower surface) of the display panel. An inner face of the first flange 63 facing a central portion of the lower container 60 may contact a portion of the light guide plate 40. In one exemplary embodiment, a height from the bottom portion 61 to the upper surface of the first flange 63 may be formed larger than a height of the light guide plate 40.

The first flange 63 may be disposed to overlap with a non-display area (not shown) formed at edges of the display panel 20. A width of the first flange 63 taken from the first sidewall 61 towards the central portion of the lower container 60 in a plan view, may be adjusted depending on a width of the non-display area of the display panel 20, so that the first flange 63 overlaps with the non-display area of the display panel 20. In one exemplary embodiment, where the gate-driving unit (not shown) is mounted on an edge of the display panel 20, the first flange 63 and the gate-driving unit may be disposed to overlap each other.

In an exemplary embodiment, where there are a pair of first flanges 63 disposed at opposing first sidewalls 62 of the lower container 60 relative to the central portion of the lower container 60, the light guide plate 40 may be disposed between the first flanges 63 facing each other, thereby reducing or effectively preventing an undesirable movement of the light guide plate 40 between the first flanges 63.

Referring to FIG. 3, to reduce or effectively prevent an undesirable movement of the light guide plate 40 in the direction of the light source assembly 80, the lower container 60 includes a fixing projection 64 protruded from the bottom portion 61. The fixing projection 64 is continuous with the bottom portion 61, the first sidewall 62 and the first flange 63. The fixing projection 64 may be protruded from the inner side face of the first flange 63, and fixed the edge of the light guide plate 40 facing the light source assembly 80. In alternative embodiments, the fixing projection 64 may be disposed in other locations of the lower container 60 than the portion where the edge of the light guide plate 40 faces the light source assembly 80, and may be positioned at a side of the light guide plate 40. In the illustrated embodiment, the fixing projection 64 is not overlapped with a light emitting portion of the light source assembly 80, such as the light source 82, so that the light projected to the light guide plate 40 is not blocked or disturbed by the fixing projection 64.

A height to an upper surface of the fixing projection 64 from the bottom portion 61 may be lower than the height to the upper surface of the first flange 63. In one exemplary embodiment, the height of the fixing projection 64 may be disposed at a minimum height to overlap an edge and/or side of the light guide plate 40 such that the light guide plate 40 may be sufficiently fixed within the lower container 60.

The light source assembly 80 includes a circuit board 81, a light source 82 and a flexible printed circuit 83. In an exemplary embodiment, the light source 82 may include a light-emitting diode ("LED") as a point source, as described above, and may be arranged at predetermined intervals on the circuit board 81.

The circuit board 81 is disposed extending longitudinally along a longitudinally extended first sidewall 62 and a longitudinally extended side face of the light guide plate 40. The circuit board 81 may be longer in the longitudinal direction and have a larger height from the bottom portion 61, than a length and a height the side face of the light guide plate 40.

The light source 82 is mounted at a first (inner) side of the circuit board 81 facing the central portion of the lower container 60, and a second side may be disposed contacting the first sidewall 62. A wiring pattern (not shown) is disposed on the circuit board 81, so power is supplied to each light source 82. In an exemplary embodiment, a reflective material for increasing the reflective rate of the light may be applied at the side of the circuit board 81 where the light source 82 is mounted.

The flexible printed circuit 83 is attached to the circuit board 81 at the first or the second side of the circuit board 81, and supplies power to the circuit board 81. The flexible printed circuit 83 includes relatively thin and flexible material, and may be bent along the bottom portion 61 or the first sidewall 62 of the lower container 60 when the light source assembly 80 is disposed in the lower container 60. In an exemplary embodiment, the flexible printed circuit 83 may be extended to an outside of the lower container 60 and or the display device through an opening (not shown) disposed in a side of the lower container 60.

The coupling member 70 fixes the light source assembly 80, and reduced or effectively prevents leakage of light discharged from the light source assembly 80, to maximize the light projected to the light guide plate 40. In the illustrated embodiment, the coupling member 70 is positioned at an inner side of the first sidewall 62 of the lower container 60, and covers (e.g., overlaps) an upper side surface of the light source assembly 80 (see FIG. 2).

In exemplary embodiments, the coupling member 70 may be formed using any one of several methods, such as injection molding, and may be formed with a same material as the lower container 60.

Referring to FIG. 2, as the coupling member 70 covers the upper side of the light source assembly 80, the light source assembly 80 may be arranged in a form where four sides are surrounded by the first sidewall 62 of the lower container 60, the bottom portion 61 of the lower container 60, the coupling member 70 and the light guide plate 40. End faces of the circuit board 81 may be disposed adjacent to the sidewall 62, such that each of the first sidewall 62 of the lower container 60, the bottom portion 61 of the lower container 60, the coupling member 70 and the light guide plate 40 may be disposed directly adjacent to the light source assembly 80 to surround the light source assembly 80 at all sides.

As illustrated in the embodiment of FIG. 2, a lower side (face) of the light source assembly 80 contacts the bottom portion 61 of the lower container 60, the light source 82 is arranged to be directly adjacent to and facing the light guide plate 40, and the circuit board 81 is arranged in such a manner that is closely adhered to the first sidewall 62. A coupling member 70 is arranged on the upper side of the light source assembly 80. In an exemplary embodiment, a reflective sheet 50 may be interposed between a portion of the light source assembly 80 and the bottom portion 61 of the container, and a reflective material may be applied on one side of the circuit board 81.

Referring again to FIG. 2, the coupling member 70 may include a reflective member (e.g., surface) 75 disposed on a side of the coupling member 70 facing the light source assembly 80. Such a reflective surface 75 guides light discharged from the light source 82 to the light guide plate 40, and reduces or effectively prevents leakage of light to the outside of the lower container 60. In one exemplary embodiment, in the reflective surface 75, reflective materials for increasing the reflection rate of light may be applied on the lower side of the coupling member 70.

The coupling member 70 includes a second sidewall 72 and a second flange 71 extended from the second sidewall 72 towards the central portion of the lower container 60. The display panel is received on the upper side of the second flange 71, and a light source assembly 80 is arranged on the lower side of the second flange 71. The second flange 71 overlaps both the display panel and the light guide plate 40. The upper surface of the first flange 63 of the lower container 60 (see FIG. 3) and the upper surface of the second flange 71 of the coupling member 70 may be formed to be at a same level from the bottom portion 61 of the lower container 60, so that the display panel may be safely received and contacted by a continuous surface defined by the upper surfaces of the first flange 63 and the second flange 72.

Since the light source 82 is disposed surrounded by the circuit board 81 including a reflective material on the side of the circuit board 81 where the light source 82 is mounted, the reflective sheet 50 and the coupling member 70 including the reflective member 75, a separate lamp cover is not necessary because elements of the display device 1 function as a lamp cover to reflect light emitted from the light source 82 towards the light guide plate 40. Advantageously, without a separate lamp cover, a number of parts required for a backlight assembly of the display device 1 is not increased and effectively reduced. Furthermore, since elements of the display device 1 functioning as the lamp cover are not formed integrally (e.g., continuous) with the lower container 60 in the exemplary embodiments, an integral lamp cover and the lower container 60 are not required to be initially divided so as to allow assembly of the light guide plate 40 and the light source assembly 80. Advantageously, without a lamp cover being integral with the lower container 60, time and costs of assembly during manufacturing are not increased and effectively reduced.

Referring to FIGS. 3 and 5, the coupling member 70 includes a guide projection 73 extended from the second sidewall 72, and disposed extending substantially parallel to a longitudinal direction of the first sidewall 62 of the lower container 60. A thickness in a direction substantially perpendicular to the longitudinal direction of the first sidewall 62 of the guide projection 73 may be formed larger than a thickness of the circuit board 81 of the light source assembly 80. The guide projection 73 is accommodated into the first guide groove 69 of the lower container 60 when the coupling member 70 is inserted into the lower container 60.

Referring to FIG. 3, the first guide groove 69 is disposed extending into an interior of a transverse first sidewall 62 of the lower container 60, and extended substantially parallel to a longitudinal first sidewall 62 of the lower container 60. A depth from an upper surface of both the transverse and longitudinal first sidewall 62 of the first guide groove 69 is configured to be a path where both an end of the circuit board 81 of the light source assembly 80 is inserted, and the guide projection 73 of the coupling member 70 is inserted, so that the coupling member 70 is fixed at the lower container 60. In the illustrated embodiment, the upper surfaces of each of the second sidewall 72 of the coupling member 70, the transverse first sidewall 62 and the longitudinal first sidewall 62 may be disposed at a same level, such that the upper surfaces essentially form a continuous upper surface.

In the coupling member 70 of the illustrated embodiment, the guide projection 73 is disposed at a first end, and is inserted into the first guide groove 69 of the lower container 60. A second end of the coupling member 70 is inserted into the second guide groove 65 of the lower container 60. The lower side of the coupling member 70 is disposed contacting an upper surface of the second guide groove 65.

The second guide groove 65 may be formed in such a manner that at least a portion of the first flange 63 is indented in a direction from an upper surface of the first flange 63 towards the bottom portion 61 of the lower container 60. In the illustrated embodiment, a thickness of the second guide groove 65 taken in a direction substantially perpendicular to the bottom portion 61 may be the same as a thickness of the second flange 71 of the coupling member 70. When the second end of the coupling member 70 is inserted into the second guide groove 65 of the lower container 60, the second flange 71 of the coupling member 70 is coupled with the second guide groove 65, and the upper surfaces of both the first flange 63 and the second flange 71 are at the same level each other, and essentially form a continuous surface.

As illustrated in FIG. 3, the first flange 63 at a transverse first sidewall 62 of the lower container 60 includes a first stepped portion defined by the second guide groove 65, since the second guide groove 65 is indented in the direction substantially perpendicular to the bottom portion 61 of the lower container 60. The first flange 63 at the transverse first sidewall 62 may also include a second stepped portion in a plan view of the lower container 60, defined by the fixing projection 64. An inner face at the distal end of the fixing projection 64 is disposed further towards the central portion of the lower container 60 than an inner face of a remainder of the first flange 63, the inner faces extended substantially parallel with the longitudinal direction of the transverse first sidewall 62. The fixing projection 64, the first flange 63, the first sidewall 62 and the bottom portion 61 form a single, continuous and indivisible lower container 60.

An exemplary embodiment of a coupling of the first sidewall 62 of the lower container 60 and the second sidewall 72 of the coupling member 70 is described with reference to FIG. 6.

The coupling member 70 includes at least one coupling projection 74 extended from an upper portion of the second sidewall 72. The coupling projection 74 is configured to be coupled with a coupling groove 66 disposed extending from the upper surface of the first sidewall 62 towards an interior of the first sidewall 62 of the lower container 60.

The coupling member 70 is coupled with the lower container 60 in a (vertical) direction which is substantially perpendicular to the bottom portion 61, and may hereinafter be referred to as an "insertion direction." The coupling projection 74 is inserted into the coupling groove 66 from the upper surface of the first sidewall 62, in the insertion direction and towards the bottom portion 61. The coupling projection 74 and the coupling groove 66 are configured to reduce or effectively prevent movement of the coupling member 70 relative to the lower container 60, in a (horizontal) direction which is substantially parallel with the bottom portion 61.

The coupling projection 74 is inserted into the coupling groove 66, and may be formed in various shapes in such a manner which reduces or effectively prevents movement of the coupling member 70 and the lower container 60 relative to each other in the horizontal direction. In the illustrated exemplary embodiment in FIGS. 3 and 6, the coupling projection 74 in a cross-section taken in the horizontal direction is formed in "T" shape.

When the coupling projection 74 is inserted into the coupling groove 66, a portion of the first sidewall 62 is disposed between portions of the coupling member 70. The "T" shaped coupling projection 74 includes a first portion extended substantially perpendicular to a longitudinal direction of the coupling member 70, and a second portion extended substantially parallel to the longitudinal direction of the coupling member 70. The portion of the first sidewall 62 is disposed between distal ends of the second portion of the coupling projection 74 and the second sidewall 72 to restrict movement of the coupling member 70 in the horizontal direction relative to the lower container 60. The coupling projection 74 is removably disposed with the coupling groove 66, such that the coupling member 70 is detachably disposed with the lower container 60.

An exemplary embodiment of a combination of a lower container 60, a light source assembly 80 and a coupling member 70 will be described in the following with reference to FIGS. 7 to 9.

As discussed above, the lower container 60 is a continuous member including the first sidewall 62, the first flange 63 and the fixing projection 64. In FIG. 7, the light source assembly 80 is disposed in the lower container 60 such that the light source assembly 80 is closely adhered to and contacts an inner surface of the first sidewall 62 of the lower container 60. The circuit board 81 of the light source assembly 80 is disposed between the fixing projection 64 and the first sidewall 62.

Since the light source 82 of the light source assembly 80 is disposed surrounded by the circuit board 81, the reflective sheet 50 and the coupling member 70, a separate lamp cover is not necessary because elements of the display device function as a lamp cover to reflect light emitted from the light source 82 towards the light guide plate 40. Advantageously, without a separate lamp cover, a number of parts required for a backlight assembly of the display device is not increased and effectively reduced.

The light guide plate 40 is disposed adjacent to a distal end of the light sources 82 of the light source assembly 80. A corner of the light guide plate 40 is disposed in the stepped portion of the first flange 63 defined by inner surfaces of the fixing projection 64 and the remainder of the first flange 63. A width of the fixing portion 64 from the circuit board 81 in a direction substantially perpendicular to a longitudinal direction of the circuit board 81, is larger than a width of the light sources 82 protruding from the circuit board 81, such that the light guide plate 40 is disposed spaced apart from the distal end of the light sources 82.

Further, a substrate insertion groove 67 (see FIG. 6), where the circuit board 81 is inserted, is disposed on the bottom portion 61 of the lower container 60. A portion of a lower side of the circuit board 81 is inserted into the substrate insertion groove 67 of the bottom portion 61 of the lower container 60, so that the circuit board 81 is closely adhered to and contacts the inner surface of the first sidewall 62. The substrate insertion groove 67 may be disposed to extend along substantially an entire length of the longitudinal first sidewall 62 adjacent to the light source assembly 80. Referring to FIG. 8, an upper surface of the circuit board 81 and an upper surface of the second guide groove 65 are coplanar and disposed at a same height from the bottom portion 61, such as to define a continuous surface upon which the coupling member 70 is disposed.

The light source assembly 80 and the light guide plate 40 are inserted into the lower container 60. In the illustrated embodiment of FIG. 9, where the light guide plate 40 (not shown) is disposed in the lower container 60, the coupling member 70 is inserted into the lower container 60 in the insertion direction which is perpendicular to the bottom portion 61, so the light source assembly 80 is fixed at the lower container 60. A lower side of the reflective surface 75 is disposed contacting the coplanar upper surfaces of the circuit board 81 and the second guide groove 65. An upper surface of the second sidewall 72 and an upper surface of the longitudinal first sidewall 62 are coplanar and disposed at a same height from the bottom portion 61, such as to define a continuous surface. An upper surface of the second flange 71 and an upper surface of the first flange 63 are coplanar and disposed at a same height from the bottom portion 61, such as to define a continuous surface upon which the display panel may be disposed.

Referring again to FIG. 9, an inner (vertical) surface of the second sidewall 72 of the coupling member 70, an inner (vertical) surface of the longitudinal first sidewall 62 and disposed at a same width from an outer surface of the longitudinal first sidewall 62, such as to define a continuous surface to which an edge face of the display panel may be disposed adjacent. An inner (vertical) surface of the transverse first sidewall 62 is also coplanar with the inner (vertical) surface of the second sidewall 72 of the coupling member 70, the inner (vertical) surface of the longitudinal first sidewall 62, such as to further define the continuous surface to which edge faces of the display panel may be disposed adjacent.

Since elements of the display device functioning as the lamp cover are not formed integrally with the lower container 60, an integral lamp cover and the lower container 60 are not required to be initially divided so as to allow assembly of the light guide plate 40 and the light source assembly 80 with the lower container 60. Advantageously, without a lamp cover being integral with the lower container 60, time and costs of assembly during manufacturing are not increased and effectively reduced.

Figure 10:
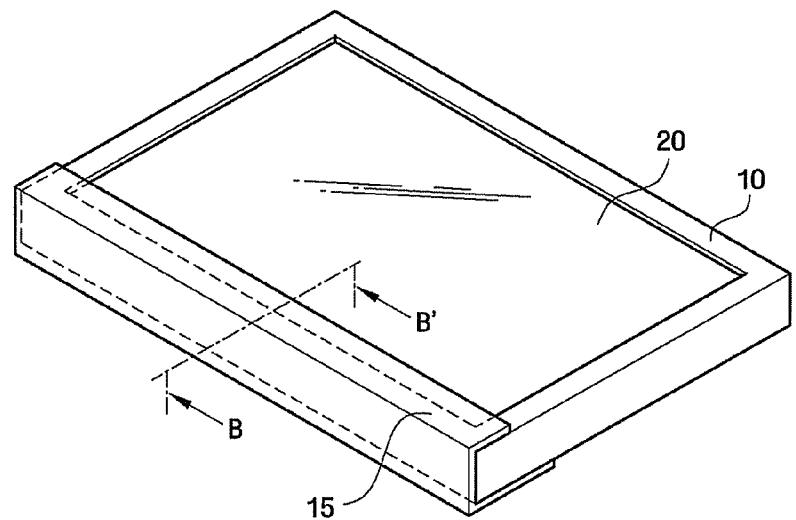
FIG. 10 is a perspective view of another exemplary embodiment of a display device according to the present invention.
Figure 11:
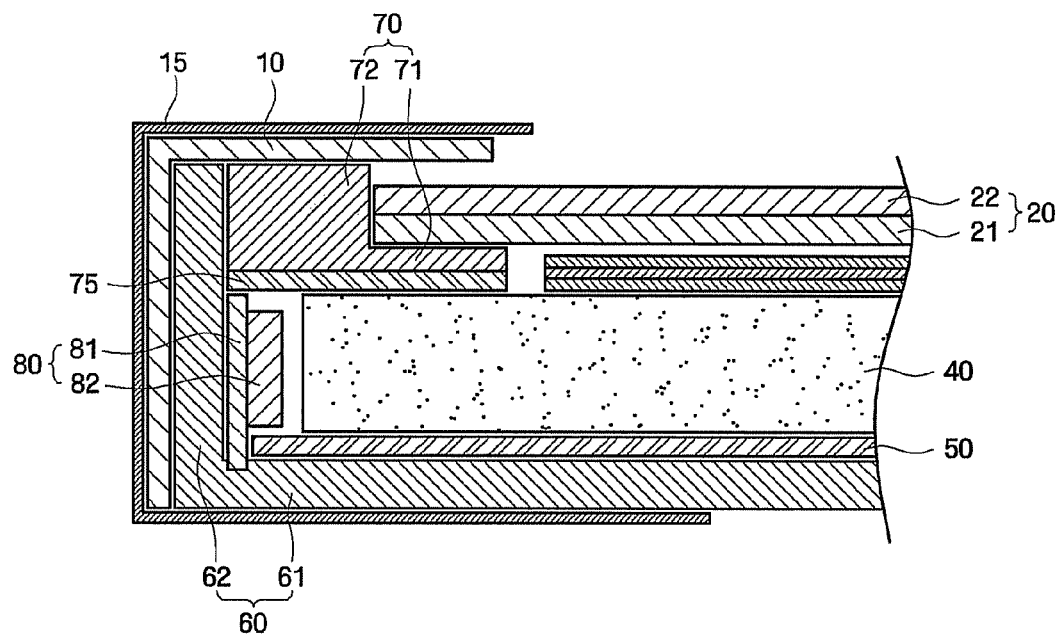
FIG. 11 is a cross-sectional view of the display device of FIG. 10 along line B-B'.

Hereinafter, an alternative exemplary embodiments of a display device according to the present invention is described with reference to FIGS. 10 and 11. FIG. 10 is a perspective view of an exemplary embodiment of a display device according to the present invention, and FIG. 11 is a cross-sectional view of the display device of FIG. 10 along line B-B'. For explanatory convenience, the same members and elements having the same function is expressed by the same reference numeral or symbol, thereby omitting repetitive explanation.

The display device according to the illustrated exemplary embodiment of the present invention includes a heat-radiating pad 15.

The heat-radiating pad 15 discharges the heat of the upper cover 10 and the lower container 60 to the outside of the display device using thermal conductive features by contacting at least a portion of both the upper cover 10 and the lower container 60. In one exemplary embodiment, the heat-radiating pad 15 may include a metal thin film having good thermal conductive features.

The heat-radiating pad 15 may be disposed to cover and overlap at least a portion of the coupling member 70, a portion of the transverse first sidewall 62, a portion of the longitudinal first sidewall 62, and a portion of the bottom portion 61, when taken in plan and cross-sectional views. The heat-radiating pad 15 may be disposed to directly contact the coupling member 70, the first sidewall 62 and/or the bottom portion 61, and may be attached on the upper cover 10 having the upper cover 10 disposed between the heat-radiating pad 15 and the coupling member 70 and the first sidewall 62.

In the illustrated embodiment, the head-radiating pad 15 is disposed at a same first sidewall 62 of the lower container 60 where the light source assembly 80 is disposed. According to the amount of heat generated from the light source 82, the area and the position of the heat-radiating pad can be adjusted. While one of a single and continuous heat-radiating pad 15 is illustrated, the present invention is not limited thereto. In alternative embodiments, a plurality of the heat-radiating pad 15 may disposed corresponding to the plurality of the light source 82 and/or a plurality of the light source assembly 80.

Figure 12:
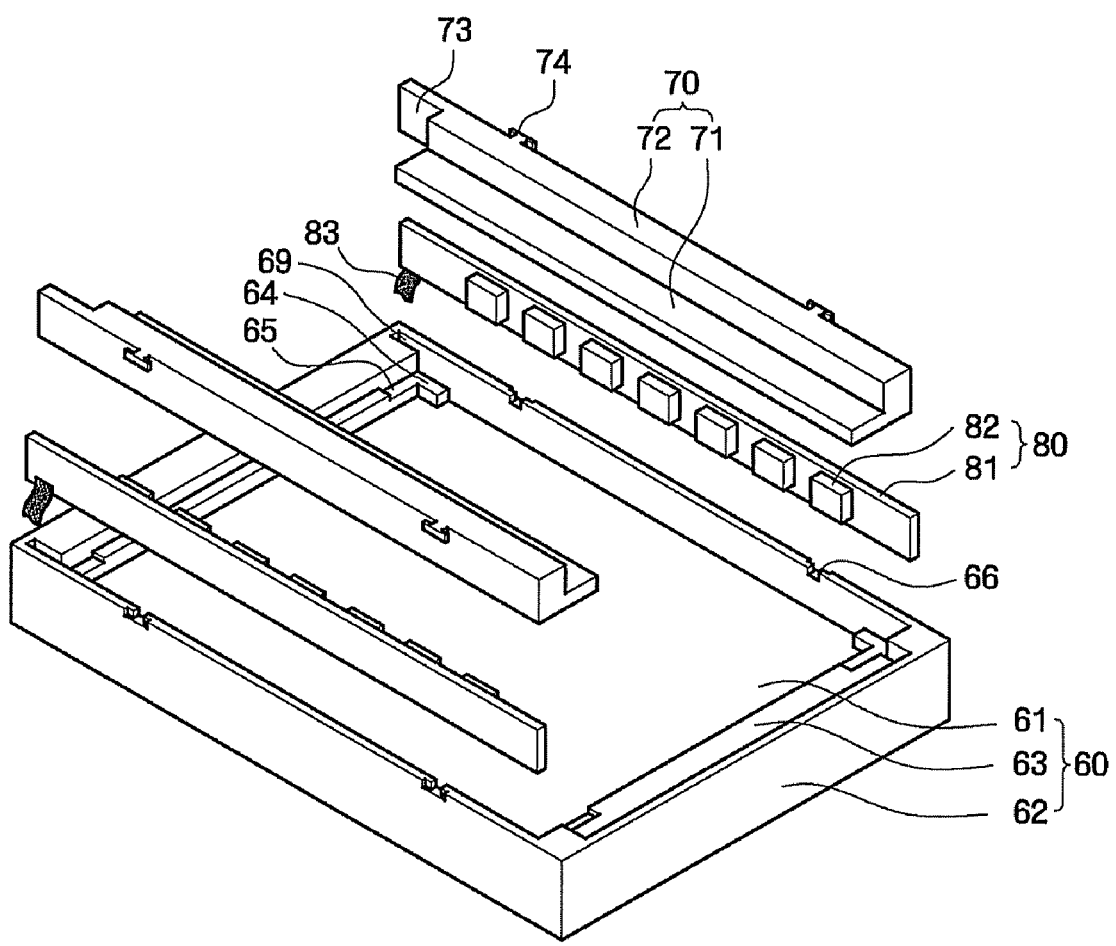
FIG. 12 is an exploded perspective view of another exemplary embodiment of a container, a light source assembly and a coupling member included in a display device according to the present invention.
Figure 13:
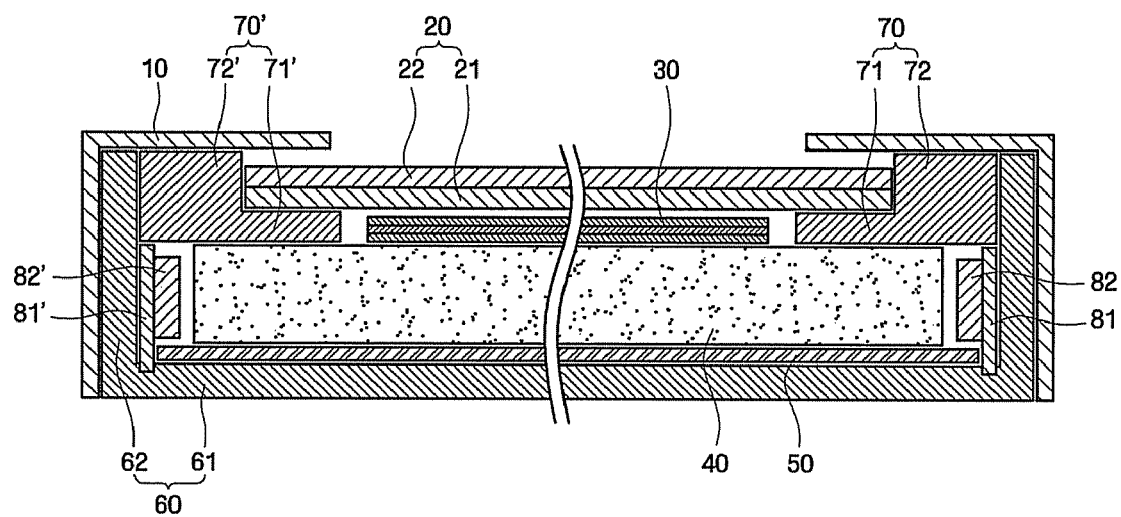
FIG. 13 is a cross-sectional view of another exemplary embodiment of a display device according to the present invention.

Hereinafter, exemplary embodiments of a display device according to the present invention is described with reference to FIGS. 12 and 13. FIG. 12 is an exploded perspective view of the exemplary embodiment of a container, a light source assembly and a coupling member included in a display device according to the present invention. FIG. 13 is a cross-sectional view of the exemplary embodiment of a display device according to the present invention. For explanatory convenience, the same members and elements having the same function is expressed by the same reference numeral or symbol, thereby omitting repetitive explanation.

Referring to FIG. 12, the display device includes a plurality of the light source assembly 80 and a plurality of the coupling member 70. Each of the light source assembly 80 and the coupling member 70 are longitudinally extended substantially parallel to transverse first sidewalls 62 of the lower container 60. Each of the coupling member 70 may be coupled to the lower container 60 in a same manner as depicted in FIGS. 7-9 discussed above.

In the display device according to the illustrated embodiment in FIG. 13, a first light source assembly 80, a second light source assembly 80', a first coupling member 70 and a second coupling member 70' are respectively arranged at both of opposing sides of the light guide plate 40, where the light source assembly 80 and 80' are arranged facing each other and having the light guide plate 40 in between. The display device includes a substantially flat and planar light guide plate 40.

The lower container 60 receives an optical sheet 30, a light guide plate 40, a reflective sheet 50, the first light source assembly 80 and the second light source assembly 80'. As described above, the first light source assembly 80 and the second light source assembly 80' are inserted into the lower container 60 in a direction which is perpendicular to the bottom portion 61 (e.g., insertion direction), and the first coupling member 70 and the second coupling member 70' are connected at an upper side of the first light source assembly 80 and the second light source assembly 80', respectively.

In connecting the first and second coupling members 70 and 70' with the first and second light source assemblies 80 and 80', the first coupling member 70 and the second coupling member 70' are coupled with the lower container 60 in the insertion direction which is perpendicular to the bottom portion 61.

The display panel 20 is disposed directly on and contacting the first flange 63 and the second flange 71 forming a continuous surface defined by the lower container 60, the first coupling member 70 and the second coupling member 70'.

Figure 14:
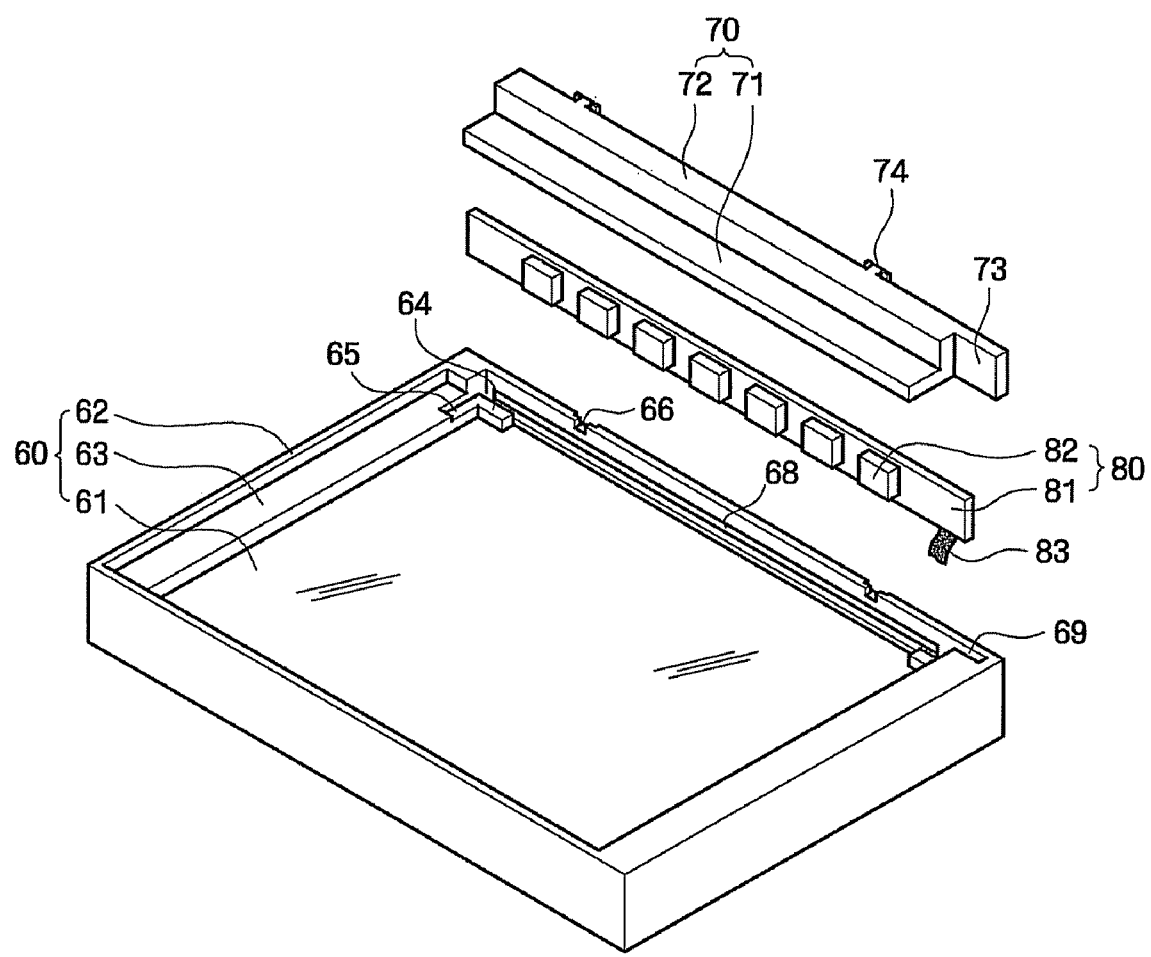
FIG. 14 is an exploded perspective view of a container, a light source assembly and a coupling member included in a display device according to the present invention.
Figure 15:
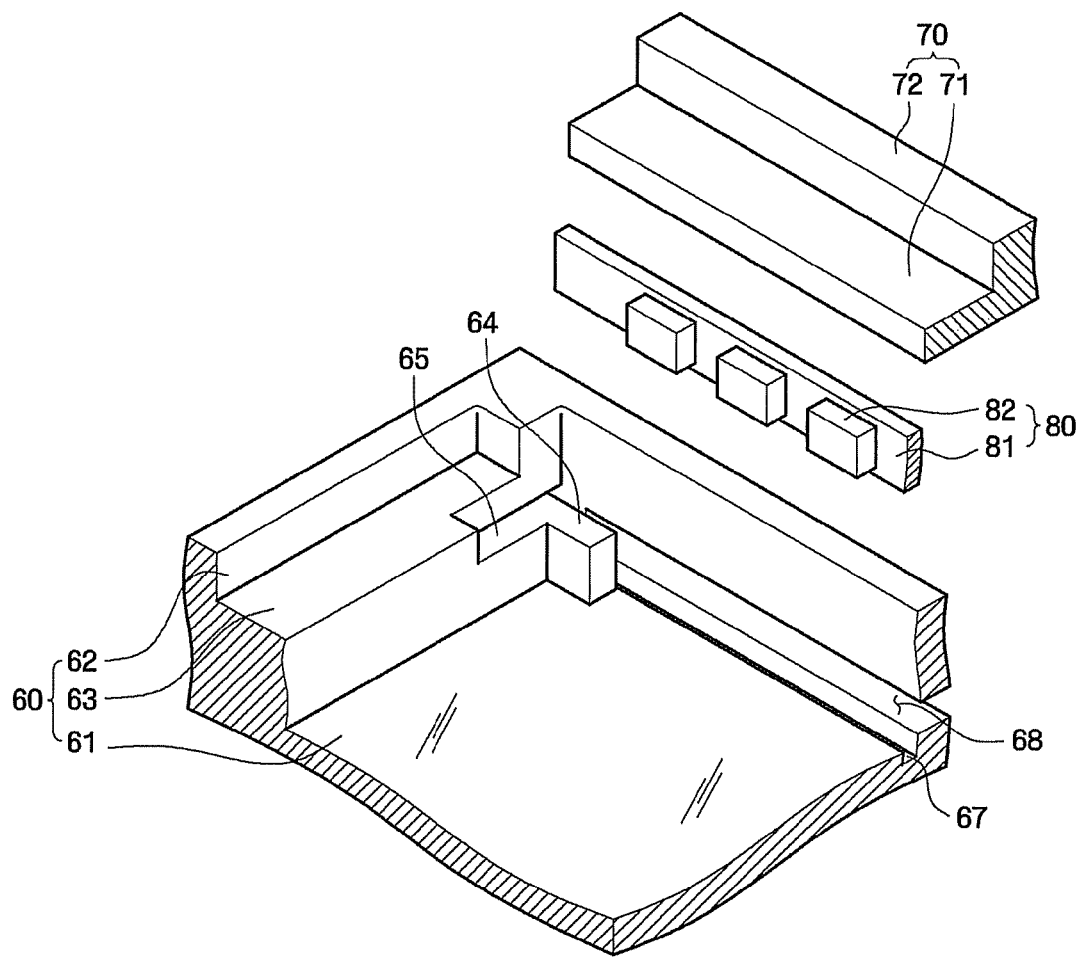
FIG. 15 is a partial enlarged view of a container, a light source assembly and a coupling member of FIG. 14.
Figure 16:
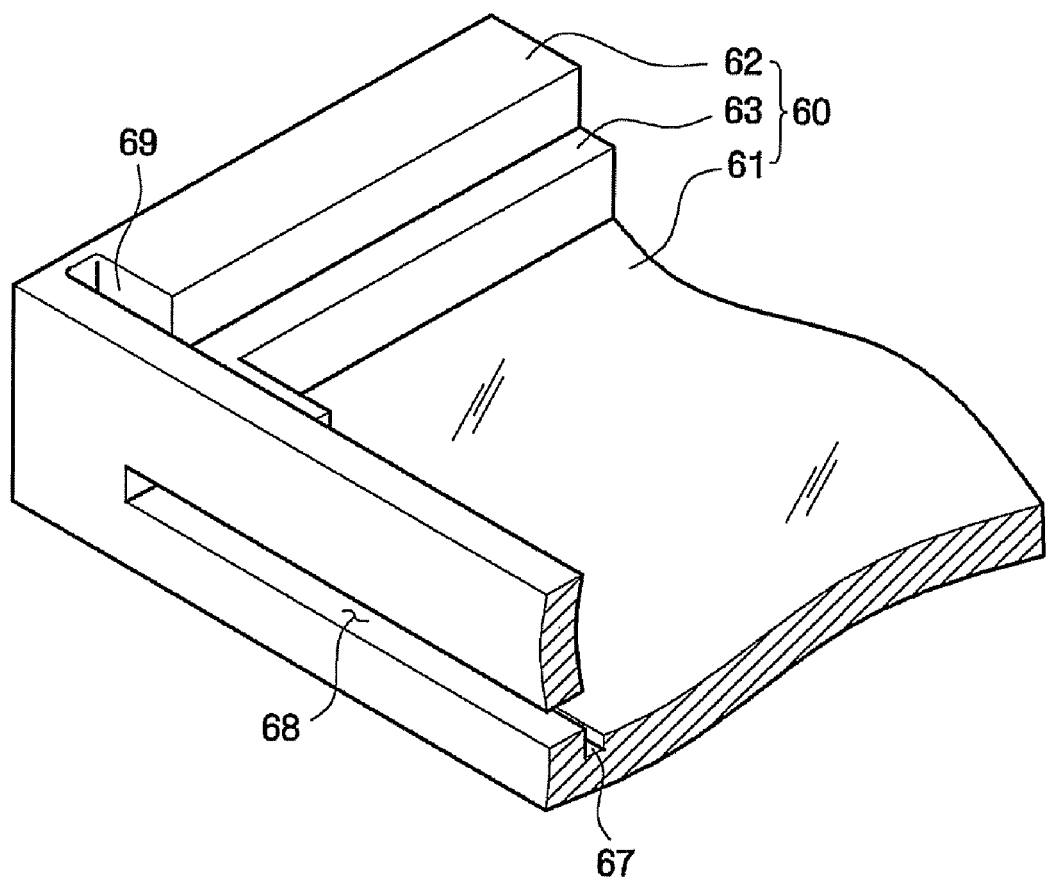
FIG. 16 is a partial perspective view of the container of FIG. 14.
Figure 17:
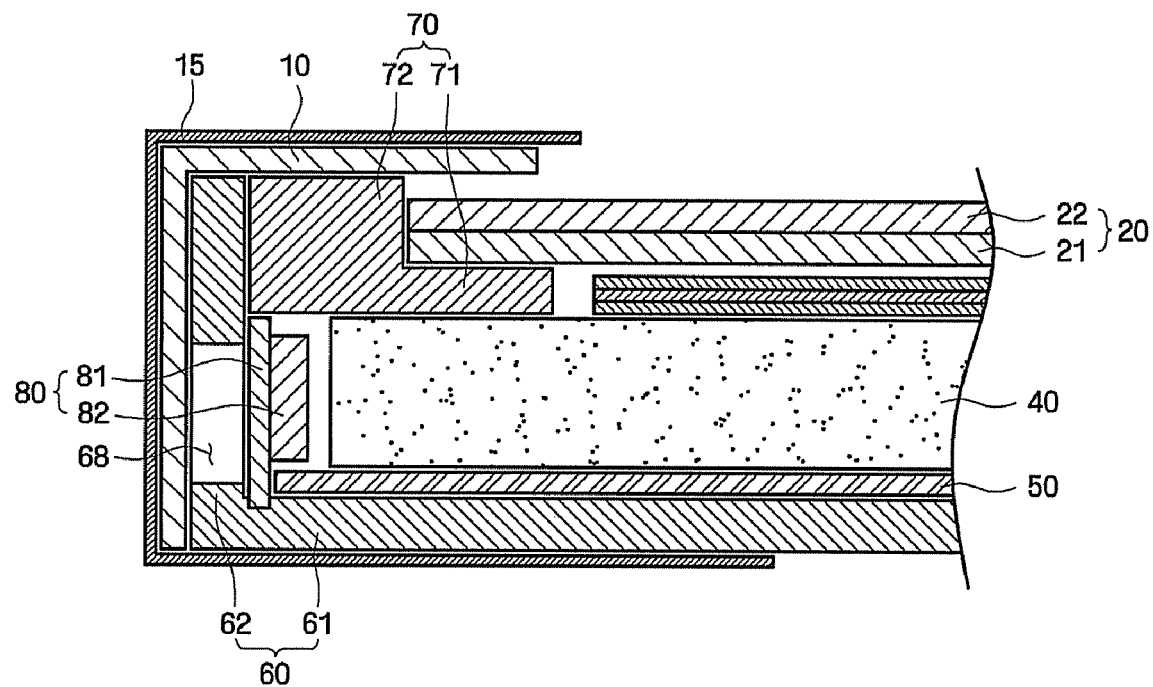
FIG. 17 is a cross-sectional view of another exemplary embodiment of a display device according to the present invention.

Hereinafter, exemplary embodiments of a display device according to the present invention will be described in detail with reference to FIGS. 14 to 17. FIG. 14 is an exploded perspective view of another exemplary embodiment of a container, a light source assembly and a coupling member included in a display device according to the present invention. FIG. 15 is a partial enlarged view of the container, the light source assembly and the coupling member of FIG. 14. FIG. 16 is a partial perspective view of the container of FIG. 14. FIG. 17 is a cross-sectional view of another exemplary embodiment of a display device according to the present invention. For explanatory convenience, the same members or elements having the same function is expressed by the same reference numerals or symbol, thereby omitting repetitive explanation.

Referring to FIGS. 14 and 15, the display device according to the illustrated exemplary embodiment includes a heat-radiating hole or opening 68 for effectively discharging heat generated in the light source assembly 80. In the display device, the light source assembly 80 is arranged at least at one side of the light guide plate 40, and the light guide plate 40 and the light source assembly 80 are inserted into the lower container 60. The light guide plate 40 and the light source assembly 80 are fixed by the coupling member 70.

Further, four sides of the light source assembly 80 are respectively surrounded by the light guide plate 40, the coupling member 70, the bottom portion 61 and the first sidewall 62. In the light source assembly 80, heat is generated according to the type and capacity of the light source 82. The heat generated in the light source assembly 80 may disadvantageously affect normal operation of the display panel 20, thereby lowering the image quality of the display panel 20. The first sidewall 62 includes a heat-radiating hole 68 in the first sidewall 62 in order to effectively discharge heat generated in the light source assembly 80.

The heat-radiating opening 68 is extended completely through the first sidewall 62, from an outer side of the lower container 60 to an inner side of the lower container 60. The heat-radiating opening 68 is an enclosed opening penetrating the first sidewall 62, such that the first sidewall 62 solely defines the enclosed heat-radiating opening 68. The heat-radiating opening 68 may longitudinally extend substantially an entire length of the first sidewall 62. The heat-radiating opening 68 may be disposed at a distance from the uppermost surface of the first sidewall 62 and at a distance from the rearmost surface of the bottom portion 61 of the lower container 60. The heat-radiating opening 68 is disposed at the first sidewall 62 where the light source assembly 80 is disposed, and overlaps a portion of the circuit board 81 of the light source assembly 80.

Referring to FIG. 16, the heat-radiating hole 68 may discharge heat to the outside of the lower container 60 by exposing at least a portion of the circuit board 81 of the light source assembly to the outside of the lower container 60. The heat-radiating hole 68 may be formed by opening a portion of the first sidewall 62, and the circuit board 81 advantageously does not need to be disposed projected to the outside of the first sidewall 62.

The heat generated in the light source 82 is transmitted to the circuit board 81, and the heat is directly radiated to the outside of the lower container 60 through the heat-radiating opening 68. In an exemplary embodiment, the upper cover 10 may include an opening (not shown) aligned with the heat-radiating opening 68, such as by removing a portion of the upper cover 10 which is overlapped with the heat-radiating hole 68.

Referring to FIG. 17, the heat-radiating efficiency may be maximized by disposing a heat-radiating pad 15 at the external portion of the lower container 60 along with forming the heat-radiating hole 68 in the lower container 60. However, the heat-radiating hole 68, the heat-radiating pad 15 and an opening in the upper cover 10 (not shown) do not necessarily need to be used at the same time, and may be optionally added.

In exemplary embodiments, it is desirable that dimensions of the heat-radiating hole 68 are smaller than a corresponding dimension of the circuit board 81 of the light source assembly 80. Referring to FIG. 17, a height in the vertical direction of the heat-radiating opening 68 is smaller than a height of the circuit board 81. Referring to FIG. 15, a length in the longitudinal direction of the circuit board 81 of the heat-radiating opening 68 is smaller than a length of the circuit board 81. In the heat-radiating hole 68, it is sufficient that the heat of the light source assembly 80 may be discharged, and it is desirable that the heat-radiating hole 68 is completely overlapped by the circuit board 81 so that the light generated from the light source 82 is not leaked.

In the illustrated exemplary embodiment, since a light source is disposed surrounded by a circuit board, a reflective sheet and a coupling member which function as a lamp cover to reflect light emitted from the light source towards a light guide plate, a separate lamp cover is not required. Advantageously, without a separate lamp cover, a number of parts required for a backlight assembly of a display device is not increased and effectively reduced. Additionally, since elements of the display device functioning as the lamp cover are not formed integrally with a container, an integral lamp cover and the container are not required to be initially divided so as to allow assembly of the light guide plate and a light source assembly including the light source. Advantageously, without a lamp cover being integral with the container, time and costs of assembly during manufacturing are not increased and effectively reduced.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A backlight assembly comprising:
a light guide plate;
a light source assembly which is disposed adjacent to at least one side of the light guide plate, and supplies light to the light guide plate;
a container which receives the light guide plate and the light source assembly, and includes a bottom portion and a first sidewall extended from edges of the bottom portion, the bottom portion and the first sidewall defining a receiving space of the container; and
a coupling member disposed inside the receiving space of the container and adjacent to an inside of the first sidewall of the container, connected to the container and overlapping an upper surface of the light source assembly,
wherein the light source assembly is directly adjacent to each of the first sidewall, the bottom portion, the coupling member and the light guide plate, and
wherein an insertion direction of the coupling member is substantially perpendicular to the bottom portion of the container.

2. The assembly of claim 1, wherein
the container further includes a first flange extended from the first sidewall to an internal side of the container,
the coupling member includes a second sidewall, and a second flange extended from the second sidewall to the internal side of the container, and
an upper side of the first flange is at a same height from the bottom portion of the container as an upper side of the second flange.

3. The assembly of claim 2, wherein
the coupling member includes at least one coupling projection extended from an upper portion of the second sidewall,
the container further includes a coupling groove extended from an upper portion of the first sidewall and coupled with the coupling projection,
the coupling projection being coupled with the coupling groove in the insertion direction which is substantially perpendicular to the bottom portion of the container, such that a portion of the first sidewall of the container is disposed between portions of the coupling projection of the coupling member in a plan view of the backlight assembly.

4. The assembly of claim 3, wherein
the coupling member further includes a guide projection extended from the second sidewall and substantially parallel with a longitudinal direction of the first sidewall, and
the container further includes:
a first guide groove in which the guide projection of the coupling member is inserted, and a second guide groove indented into the first flange, and in which a first end of the second flange of the coupling member is inserted.

5. The assembly of claim 4, wherein a cross-section of the coupling projection in a second direction which is substantially parallel with the bottom portion, is formed in "T" shape.

6. The assembly of claim 2, wherein
the coupling member includes a guide projection extended from the second sidewall and substantially parallel with a longitudinal direction of the first sidewall, and
the container further includes:
  a first guide groove in which the guide projection of the coupling member is inserted, and
  a second guide groove indented into a portion of the first flange, and in which a first end of the second flange is inserted.

7. The assembly of claim 1, wherein the container further includes a fixing projection projected from the bottom portion of the container, disposed longitudinally extending substantially parallel to the first sidewall, and disposed between the light guide plate and the light source assembly, the fixing projection restricting movement of the light guide plate in a second direction which is substantially parallel with the bottom portion.

8. The assembly of claim 1, wherein the coupling member includes a reflective surface disposed on a side of the coupling member facing the light source assembly.

9. The assembly of claim 1, wherein the first sidewall comprises a heat-radiating opening, where at least a portion of the light source assembly is exposed to an outside of the container.

10. The assembly of claim 1, wherein the light source assembly comprises:
  a circuit substrate disposed extending substantially parallel to the first sidewall of the container; and
  a light-emitting diode mounted on a first side of the circuit substrate.

11. A display device comprising:
  a display panel which displays images; and
  a backlight assembly comprising:
    a light source assembly which generates and supplies light to the display panel;
    a light guide plate which guides the light supplied from the light source assembly to the display panel;
    a container including a bottom portion, and a first sidewall portion and a second sidewall portion directly adjacent to the first sidewall portion, the first and second sidewall portions each extended from edges of the bottom portion to define a receiving area of the container, the light guide plate and the light source assembly disposed in the receiving area; and
    a coupling member disposed in the receiving area of the container, disposed adjacent to an inside of the first sidewall portion, and overlapping an upper surface of the light source assembly,
    wherein the light source assembly is adjacent to each of the first sidewall portion, the bottom portion, the coupling member and the light guide plate, and
    wherein insertion direction of the coupling member is substantially perpendicular to the bottom portion of the container.

12. The device of claim 11, wherein
the container further includes a first flange which is extended from the second sidewall portion to an inside of the container,
the coupling member includes a third sidewall portion and a second flange which is extended from the third sidewall portion to the inside of the container, and
an upper surface of the first flange is at a same height from the bottom portion as an upper surface of the second flange.

13. The device of claim 12, wherein
the coupling member further includes at least one coupling projection extended from an upper portion of the third sidewall portion, and
the container further includes a coupling groove extended from an upper surface of the first sidewall portion and coupled with the coupling projection at the first sidewall portion.

14. The device of claim 12, wherein
the coupling member includes a guide projection extended from the third sidewall portion and substantially parallel to the first sidewall portion, and
the container further includes:
  a first guide groove disposed in the second sidewall portion, and in which the guide projection is inserted, and
  a second guide groove disposed indented into an upper surface of the first flange, and in which a first end of the second flange of the coupling member is inserted.

15. The device of claim 11, wherein the container further includes a fixing projection projected from the bottom portion of the container, and disposed between the light guide plate and the light source assembly, the fixing projection restricting movement of the light guide plate in a second direction which is substantially parallel with the bottom portion.

16. The device of claim 11, further comprising a heat-radiating pad overlapping at least a portion of the coupling member, the first sidewall portion and the bottom portion.

17. A method of manufacturing a display device, the method comprising:
  disposing a light guide plate and a light source assembly in a container which includes a bottom portion, and a first sidewall portion and a second sidewall portion disposed directly adjacent to the first sidewall portion each of which extends from edges of the bottom portion; and
  connecting the container with a coupling member which is disposed between the first and second sidewall portions of the container and overlapping an upper surface of the light source assembly,
  wherein the light source assembly is disposed directly adjacent to the first sidewall portion, the bottom portion, the coupling member and the light guide plate, and
  wherein the coupling member is coupled to the container in a first direction which is substantially perpendicular to the bottom portion, such that the coupling member is disposed between the first and second sidewall portions of the container.

18. The method of claim 17, wherein
the container further includes a first flange extended from an inner surface of the first sidewall portion toward an inner area of the container,
the coupling member includes a third sidewall portion and a second flange extended from an inner surface of the third sidewall portion toward the inner area of the container, and
an upper surface of the first flange is at a same height from the bottom portion as an upper surface of the second flange.

19. The method of claim 18, wherein
the coupling member further includes at least one coupling projection extended from the third sidewall portion, and the container further includes a coupling groove extended into the first sidewall portion, the coupling groove being coupled with the coupling projection.

20. The method of claim 19, wherein the coupling member further includes a guide projection extended from the third sidewall portion and substantially parallel with the first sidewall portion, and the container further includes:

a first guide groove disposed in the second sidewall portion, in which the guide projection is inserted, and a second guide groove indented into the first flange, in which a first end of the second flange of the coupling member is inserted.

\* \* \* \* \*